US010067220B2

United States Patent
Schillings

(10) Patent No.: US 10,067,220 B2
(45) Date of Patent: Sep. 4, 2018

(54) POSITIONAL STATE IDENTIFICATION OF MOBILE DEVICES

(71) Applicant: Yahoo!, Inc., Sunnyvale, CA (US)

(72) Inventor: Benoit Schillings, Los Altos Hills, CA (US)

(73) Assignee: Oath Inc., New York, NY (US)

( * ) Notice: Subject to any disclaimer, the term of this patent is extended or adjusted under 35 U.S.C. 154(b) by 685 days.

(21) Appl. No.: 14/587,313

(22) Filed: Dec. 31, 2014

(65) Prior Publication Data

US 2016/0187452 A1    Jun. 30, 2016

(51) Int. Cl.
*G01S 3/80* (2006.01)
*G01S 5/18* (2006.01)
*H04M 1/725* (2006.01)
*H04M 1/60* (2006.01)

(52) U.S. Cl.
CPC .......... *G01S 5/18* (2013.01); *H04M 1/72569* (2013.01); *H04M 1/6008* (2013.01)

(58) Field of Classification Search
CPC ... G01S 3/80; G01S 5/18; G01S 15/06; G01S 15/08; G01S 7/54; G01S 15/87; H04M 1/72569; H04M 1/6008
USPC ..... 367/99, 107, 89, 100, 103, 87, 101, 105, 367/118, 131, 159, 173, 178, 4, 7, 93, 96; 342/118, 124, 146, 147, 22, 70; 381/190; 340/10.1, 5.1, 686.1; 341/176; 702/150, 702/155, 55; 707/609, 722, 769
See application file for complete search history.

(56) References Cited

U.S. PATENT DOCUMENTS

| | | | | |
|---|---|---|---|---|
| 4,581,726 A | * | 4/1986 | Makino | G01S 7/52004 267/99 |
| 6,542,436 B1 | * | 4/2003 | Myllyla | G01S 7/527 340/686.6 |
| 2005/0037730 A1 | * | 2/2005 | Montague | B60R 25/1004 455/404.2 |
| 2005/0046584 A1 | * | 3/2005 | Breed | B60C 11/24 340/13.31 |
| 2006/0208169 A1 | * | 9/2006 | Breed | B60N 2/002 250/221 |
| 2006/0291667 A1 | * | 12/2006 | Watanabe | H04R 1/323 381/77 |
| 2008/0036580 A1 | * | 2/2008 | Breed | B60R 21/01536 340/438 |

(Continued)

*Primary Examiner* — Isam A Alsomiri
*Assistant Examiner* — Amie M Ndure
(74) *Attorney, Agent, or Firm* — Copper Legal Group, LLC

(57) ABSTRACT

One or more systems and/or methods for identifying a positional state of a mobile device are provided. An output audio pulse may be generated from a speaker of a mobile device. An input audio pulse, corresponding to the output audio pulse, may be detected utilizing a microphone of the mobile device. The output audio pulse and the input audio pulse may be evaluated to determine a positional feature associated with the mobile device. The positional feature may be evaluated using a classifier to identify a positional state of the mobile device (e.g., the mobile device may be laying on a table, inside a user's jacket pocket, within a vehicle, etc.). In an example, an operating characteristic of the mobile device may be adjusted based on the positional state of the mobile device (e.g., a ringer volume may be increased, a content recommendation may be displayed, etc.).

19 Claims, 12 Drawing Sheets

(56) References Cited

U.S. PATENT DOCUMENTS

| | | | | |
|---|---|---|---|---|
| 2008/0236275 A1* | 10/2008 | Breed | ............... | B60C 11/24 |
| | | | | 73/290 V |
| 2009/0092284 A1* | 4/2009 | Breed | ............... | B60J 10/00 |
| | | | | 382/103 |
| 2009/0124231 A1* | 5/2009 | Kroll | ............... | H04M 1/677 |
| | | | | 455/404.1 |
| 2010/0034363 A1* | 2/2010 | O'Connell | ......... | H04M 1/656 |
| | | | | 379/88.23 |
| 2010/0141518 A1* | 6/2010 | Hersey | ............ | G01C 13/008 |
| | | | | 342/357.64 |
| 2012/0087212 A1* | 4/2012 | Vartanian | ......... | G01S 15/08 |
| | | | | 367/118 |
| 2013/0188456 A1* | 7/2013 | Adcock | ............ | G01S 5/18 |
| | | | | 367/127 |
| 2013/0336093 A1* | 12/2013 | Suvanto | ........... | G01S 15/06 |
| | | | | 367/99 |
| 2014/0334271 A1* | 11/2014 | Park | ............... | G04G 21/04 |
| | | | | 368/10 |

* cited by examiner

POSITIONAL STATE IDENTIFICATION OF MOBILE DEVICES

BACKGROUND

Many users may own and/or interact with mobile devices. In an example, a user may read an electronic book on a tablet. In another example, the user may navigate to a new location using a map application on a smart phone. A mobile device may transition between various positional states during a day, such as being carried around in a pocket, being placed face up on a table, being left in a parked car, being carried around in a bag while on a hike, etc. Such positional states may be indicative of content that may be interesting to the user (e.g., a recommendation of a hiking destination when hiking), an efficient means of notifying or alerting the user of information (e.g., a loud audio notification may be more efficient in getting the user's attention than a vibration notification while the mobile device is in the bag during hiking, whereas a quiet audio notification or the vibration notification may be more appropriate while the user is in a meeting with the mobile device on a meeting room desk), and/or efficient resource consumption (e.g., transitioning the mobile device into a low powered state while in the parked car). Unfortunately, many computing devices and/or content provides may lack technology that can determine a positional state of a mobile device, which may result in ineffective communication with the user (e.g., a notification that does not alert the user of information) and/or inefficient resource consumption of the mobile device that can lead to reduced battery life.

SUMMARY

In accordance with the present disclosure, one or more systems and/or methods for identifying a positional state of a mobile device are provided. An output audio pulse may be generated from a speaker of a mobile device. In an example, the output audio pulse may be emitted at an ultrasonic frequency, an infrasonic frequency, or any other frequency. An input audio pulse, corresponding to the output audio pulse, may be detected utilizing a microphone of the mobile device. The output audio pulse and the input audio pulse may be evaluated to determine a positional feature associated with the mobile device. In an example, the output audio signal and the input audio signal may be evaluated by comparing an output amplitude of the output audio pulse with an input amplitude of the input audio pulse to determine the positional feature. In another example, the output audio signal and the input audio signal may be evaluated by identifying the positional feature based upon a time period between the generation of the output audio pulse and the detection of the input audio pulse. The positional feature may be evaluated using a classifier to identify a positional state of the mobile device. In an example, user feedback may be obtained corresponding to the adjustment of the operating characteristic. The classifier may be trained based upon the user feedback.

In an example, an operating characteristic of the mobile device may be adjusted based on the positional state of the mobile device. The adjusting the operating characteristic (e.g., a power characteristic, a notification characteristic, a data usage characteristic, a processing characteristic, an application management characteristic, etc.) may comprise modifying an operation of at least one of a display (e.g., a screen may be dimmed, a message or recommendation may be displayed on the display), an audio component (e.g., increasing a volume), a vibrator (e.g., switching vibration on or off), a processor (e.g., transitioning the processor from a higher power state to a lower powered state), a camera, a communication module of the mobile device (e.g., a Bluetooth module may be turned off or on), etc. For example, adjusting the operating characteristic may comprise adjusting a notification type of a notification (e.g., displaying a text notification as opposed to an audio notification so as not to disturb a meeting in which a user has placed the mobile device on a conference room table), a volume level of an audio notification, and/or a vibration level of a vibration notification. In another example, responsive to the positional state indicating that the mobile device is contained within at least one of a container, a bag, or a pocket, the mobile device may be transitioned from a first power state (e.g., a performance mode) to a second power state (e.g., a power save mode), wherein the second power state has a lower power consumption than the first power state.

In an example, user interest information may be identified based upon the positional state of the mobile device. The user interest information may correspond to an interest (e.g., outdoor activities, Cleveland football team, etc.) of the user and/or an activity of the user (e.g., walking, biking, etc.). Content may be obtained that corresponds to the user interest information (e.g., a location of nearby bike shop, an advertisement for a soccer ball, etc.). The content may be provided to the mobile device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
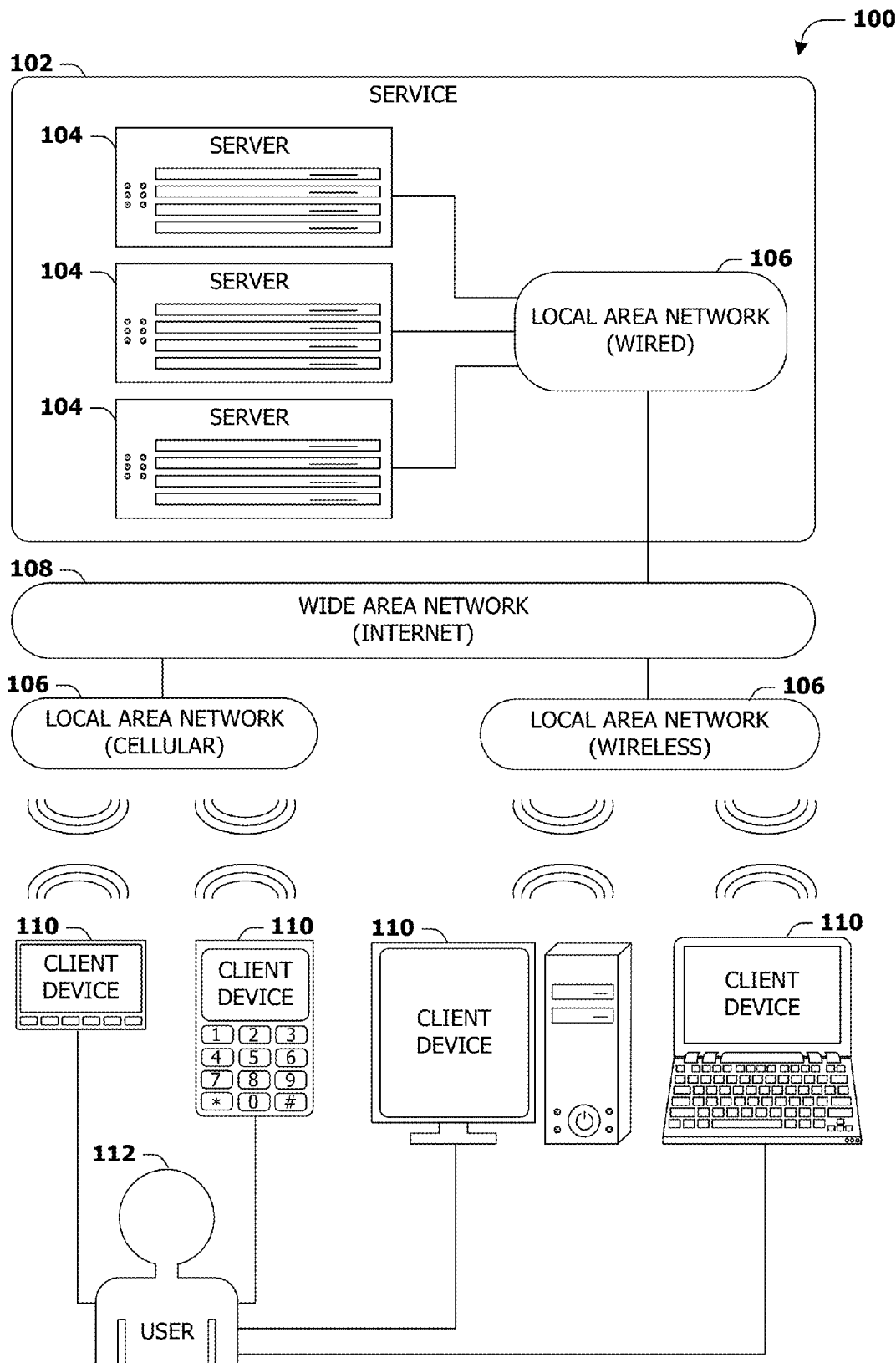
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
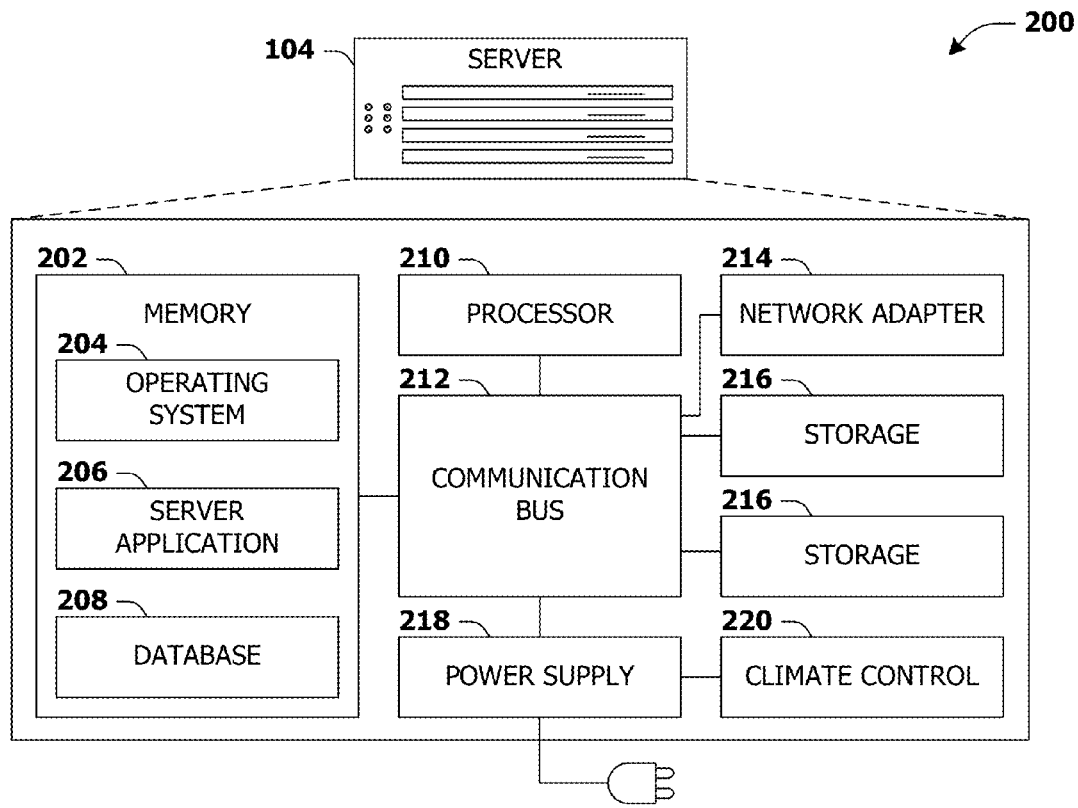
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
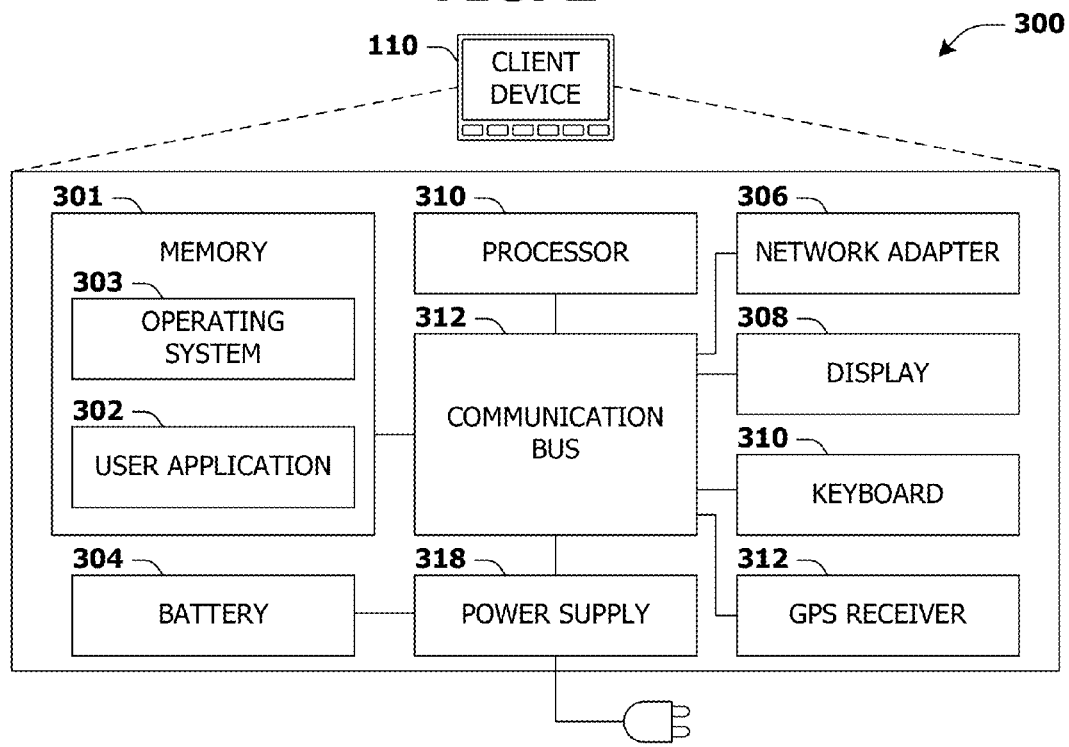
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for identifying a positional state of a mobile device are provided. Many mobile devices may lack detection techniques and/or functionality to determine a positional state of a mobile device and/or the ability to adjust operating characteristics of the mobile device based on the positional state. As provided herein, an output audio pulse may be generated from a speaker of a mobile device and an input audio pulse, corresponding to the output audio pulse, may be detected utilizing a microphone of the mobile device. The output audio pulse and the input audio pulse may be evaluated to determine a positional feature (e.g., audio characteristics and/or values corresponding to the output audio pulse and the input audio pulse) associated with the mobile device. The positional feature may be evaluated using a classifier (e.g., a database containing values used to correlate the positional feature to a positional state) to identify a positional state (e.g., a location and/or environment) of the mobile device. In an example, an operating characteristic (e.g., a power characteristic, a notification characteristic, a data usage characteristic, a processing characteristic, an application management characteristic, etc.) of the mobile device may be adjusted based on the positional state of the mobile device. The adjusting the operating characteristic may comprise modifying an operation of at least one of a display, an audio component, a vibrator, a processor, a camera, or a communication module of the mobile device.

As provided herein, the positional state of a mobile device may be identified through the utilization of one or more sensors present in most mobile devices, such as speakers and/or microphones. Thus, no additional sensors need to be incorporated into the mobile device, which may reduce manufacturing costs (e.g., a cost of additional sensors and/or incorporating the additional sensors into the mobile device), design limitations (e.g., space limitations associated with a layout of the mobile device), and/or power consumption associated with operating additional sensors. The positional state of the mobile device may be utilized to adjust an operating characteristic (e.g., power characteristics, data usage characteristics, notification characteristics, etc.) of the mobile device to enhance the user's experience (e.g., providing an audio notification, as opposed to a vibration notification, while the mobile device is in a user's pocket so that the user has a higher likelihood of noticing a notification), as well as reduce power consumption (e.g., increasing battery life), network usage (e.g., bandwidth), and/or computing resources otherwise wasted during periods of inactivity by the user (e.g., operating the mobile device in a high performance mode while the mobile device is in a pocket of the user may waste of battery life). Accordingly, the operating efficiency, functionality, and/or power consumption of the mobile device may be improved (e.g., reduce the amount of data/bandwidth/battery used when the mobile device is in a bag, pocket, etc.; increase the processing speed of the mobile device when the mobile device is being held by the user; etc.).

Figure 4:
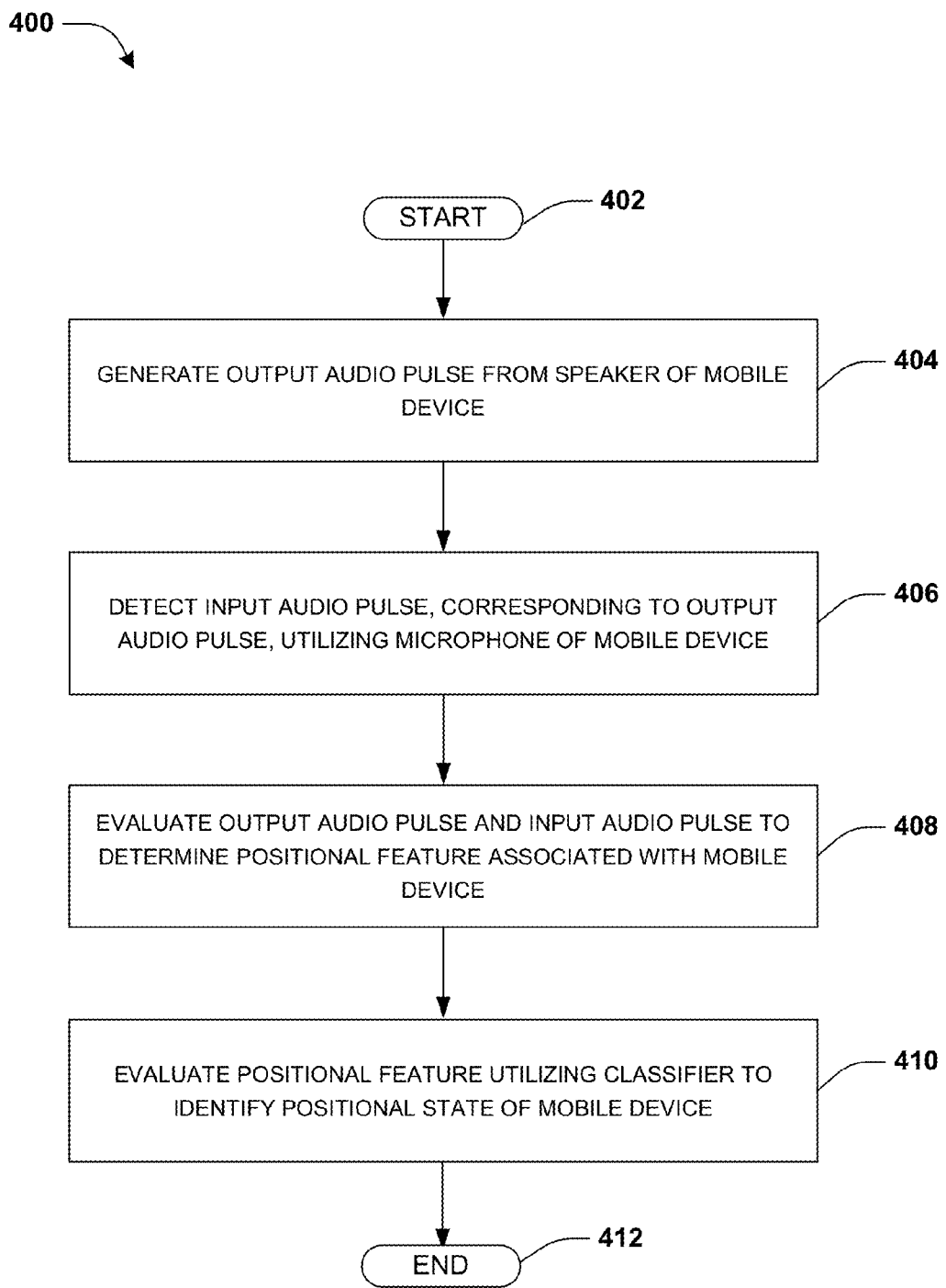
FIG. 4 is a flow chart illustrating an example method of identifying a positional state of a mobile device.

An embodiment of identifying a positional state of a mobile device is illustrated by an example method 400 of FIG. 4. At 402, the method starts. At 404, an output audio pulse may be generated from a speaker of a mobile device (e.g., smartphone, tablet, personal digital assistant, smartwatch, etc.). In an example, the output audio pulse may be generated by emitting the output audio pulse at an ultrasonic frequency, an infrasonic frequency, or any other frequency. In an example, the output audio pulse may comprise a modulated signal. In an example, the modulated signal may be generated by a non-coherent modulation process or a coherent modulation process. In an example, the output audio pulse may be generated periodically (e.g., once every second, once every minute, once every 10 minutes, etc.).

At 406, an input audio pulse, corresponding to the output audio pulse, may be detected utilizing a microphone of the mobile device. In an example, the output audio pulse emitted by the speaker may be distorted by an environment proximate the mobile device before being detected by the microphone, as the input audio pulse. The distortion may comprise a delay attribute (e.g., time between when the output audio pulse is emitted and the input audio pulse is detected, etc.), a global attenuation, and/or a frequency attenuation (e.g., how strongly an audio pulse decreases as a function of a frequency, etc.). For example, the input audio pulse may correspond to a reflection (e.g., echo) of the output audio pulse off a surface of an object (e.g., an inside of a bag, a hand of a user, etc.).

At 408, the output audio pulse and the input audio pulse may be evaluated to determine a positional feature associated with the mobile device. In an example, the positional feature may correspond to a convolution of the output audio pulse and a set of conditions (e.g., a surrounding environment) surrounding the mobile device. In an example, evaluating the output audio pulse and the input audio pulse may comprise comparing an output amplitude of the output audio pulse with an input amplitude of the input audio pulse to determine the positional feature. In another example, evaluating the output audio pulse and the input audio pulse may comprise identifying the positional feature based upon a time period between the generation of the output audio pulse and the detection of the input audio pulse. In another example, the positional feature may be determined by evaluating one or more attributes between the output audio pulse and the input audio pulse, such as by a time of flight analysis (e.g., a method of measuring the time required for a pulse to travel a distance through a medium), a frequency response analysis, etc.

At 410, the positional feature may be evaluated utilizing a classifier to identify a positional state of the mobile device. In an example, the positional state may indicate a location (e.g., in a bag, in a car, etc.) and/or an activity (e.g. running, walking, being stationary, etc.). In an example, the positional state may indicate that the mobile device is contained within a pocket, contained within a bag (e.g., a purse), laying on a surface in a room (e.g., on a desk in an office), located within a vehicle, being interact with by a user, stationary, located in an outdoor area, being held by the user (e.g., in the hand of the user), etc.

In an example, content (e.g., a recommendation of a close hiking trail, an advertisement for hiking boots, an incoming message, an incoming phone call, etc.) may be provided to the user through the mobile device and/or a second device (e.g., a smart watch, a tablet, a personal computer, a smart television, a gaming console, etc.) based upon an awareness threshold. The awareness threshold correspond to a threshold awareness such that a particular type of notification on a particular device may be noticed by the user, which may be based upon distance between the user and a device, a location of the device, an activity of the user, etc. For example, responsive to the positional state indicating a user awareness of the mobile device exceeding the awareness threshold (e.g., the user is holding the phone within the user's hand), content may be provided to the user through the mobile device (e.g., the user may notice a visual recommendation). In another example, responsive to the user awareness of the mobile device not exceeding the awareness threshold (e.g., the user is playing soccer with the phone in the user's pocket), content may be provided to the user through the second device (e.g., a smartwatch that the user may easily check while playing soccer). For example, an awareness threshold may be a value of 5 on a scale of 1-10, or any other value on any other scale. If a smartphone is held in hand of the user, the user awareness may be a 10 and the content may be displayed on the smartphone. If the smartphone is across a room from the user on a table, the user awareness may be a 3 and the content may be displayed on a smartwatch worn by the user.

In an example, responsive to identifying the positional state of the mobile device, user feedback may be obtained from the user. In an example, the user feedback may be evaluated to determine if the positional state, identified by the classifier, was correct and/or whether the user approved of an action taken based upon the positional state (e.g., muting the mobile device, providing a hiking trail recommendation, etc.). In an example, the user feedback may be utilized to modify and/or train the classifier. For example, audio characteristics and/or other features, utilized by the classifier to determine positional states, may be modified based upon the user feedback.

In an example, an operating characteristic of the mobile device may be adjusted based on the positional state of the mobile device. In an example, an operational controller may adjust one or more operating characteristics based on the positional state. For example, an operation of at least one of a display, an audio component, a vibrator, a processor, a camera, or a communication module (e.g., a cellular connection module, a Wi-Fi module, a Bluetooth module, etc.) of the mobile device may be modified, such as turned on, turned off, or adjusted (e.g., adjust a screen brightness). In an example, the operating characteristic may comprise a power characteristic (e.g., a performance mode, etc.), a notification characteristic (e.g., a notification type such as a text message notification, an audio notification, an email notification, a social network post notification, a vibration notification, and/or any other means of communicating information, such as recommendations to the user through the mobile device), a data usage characteristic, a processing characteristic, and/or an application management characteristic (e.g., a video app may be placed into a suspended state based upon a determination that the mobile device is within a briefcase). In an example, adjusting an operating characteristic may comprise adjusting a data usage function of an application operating on the mobile device and/or adjusting a performance mode of the mobile device.

In an example, adjusting the notification characteristic may comprise adjusting a notification type, a volume level of an audio notification, a vibration level of vibration notification, and/or a notification duration based upon the positional state of the mobile device. The notification type may comprise an audio notification (e.g., a ringtone, a chime, etc.), a visual notification (e.g., a banner notification, a camera flash, etc.). For example, if the positional state is in a bag, the notification type may be adjusted to an audio notification. In another example, if the positional state is face up on a table, the notification type may be adjusted to a visual notification.

In an example, responsive to the positional state indicating that the mobile device is contained within a container, a bag, or a pocket, the mobile device may be transitioned from a first power state (e.g., a high performance mode) to a second power state (e.g., a power save mode). The second power state may have a lower power consumption than the first power state, which may conserve battery consumption of the mobile device.

In an example, the user may define what operating characteristic adjustments to make for various positional states of the mobile device, which may be used to generate an operational profile. The operational profile may comprise a set of operating characteristics, such as operating characteristics defined by the user, for various positional states. In an example, responsive to the positional state indicating that the mobile device is located in an outdoor area, the operational profile may be assessed to determine that a notification characteristic is to be adjusted to an audio notification type.

In an example, user feedback, corresponding to the adjustment of the operating characteristic (e.g., entering a power save mode, turning a Wi-Fi receiver off, etc.), may be obtained. For example, responsive to adjusting the performance mode of the mobile device to a power save mode based upon the mobile device being within a car, user feedback may be requested from the user to determine whether to subsequently adjust the performance mode when the mobile device is within a car. In an example, the classifier and/or an operational controller may be trained based upon the user feedback (e.g., an instruction to not put the mobile device into the power save mode if the user feedback indicates a negative reaction to the power save mode). In an example, machine learning may be utilized to train the classifier and/or the operational controller based upon the user feedback. For example, if the user periodically changes the notification type from a visual notification to an audio notification prior to putting the mobile device in a pocket, the operational controller may be trained to adjust from using visual notification to using audio notifications based upon the mobile device being contained in a pocket.

In an example, user interest information may be identified based upon the positional state of the mobile device. The user interest information may correspond to an interest and/or an activity of the user (e.g., business travel with a briefcase, running, playing soccer, playing the guitar, etc.). The user interest information may be utilized to obtain content corresponding to the user interest information (e.g., an advertisement for running shoes based upon a positional state indicating the user is outside and social media content indicating the user enjoys running). The content may be provided to the mobile device.

In an example, a second positional feature may comprise secondary sensor information from a second sensor. In an example, the second sensor may comprise a motion sensor, such as an accelerometer, a light sensor, a global positioning sensor, a proximity sensor, a time sensor (e.g., a clock), a gyroscope, a temperature sensor, and/or any other type of sensor. In an example, the classifier may be utilized to identify a positional state of the mobile device by evaluating the positional feature and the second positional feature (e.g. the positional feature may identify that the mobile device is in the pocket of the user and the second positional feature, corresponding to secondary information from an accelerometer, may identify that the user is out on a run with the mobile device).

In an example, content (e.g., an advertisement from an advertisement repository, music from a music application, a news article from a news application, etc.) may be provided to the user through a recommendation. For example, the recommendation may be generated for content based upon the positional state of the mobile device. A recommendation notification type (e.g., an audio notification, a vibration notification, a visual notification, etc.) for the recommendation may be selected based upon the positional state. The recommendation may be provided to the mobile device according to the recommendation notification type. In an example, the recommendation notification type may comprises an audio notification, a vibration notification, a text message, a visual notification, an email, a video notification, a push notification, display of an application user interface, etc. In an example, the recommendation of content may be based upon the positional state and/or a user profile. For example, if the user is outdoors running, rock music content may be recommended based upon the user running and the user profile indicating that the user likes rock music.

In an example, an activity and/or activity level of the user may be determined based upon the positional state of the mobile device over a period of time. In an example, the activity and/or activity level of the user may be utilized by a mobile application. For example, a fitness application may send the user a notification indicating that an activity level of the user is below a threshold activity level (e.g. the user may have been sitting at a desk for 5 hours). In another example, the fitness application may send the user a notification regarding an activity, such as a notification that the user has been walking for 20 minutes based upon the positional state of the mobile device changing for 20 minutes.

Figure 5A:
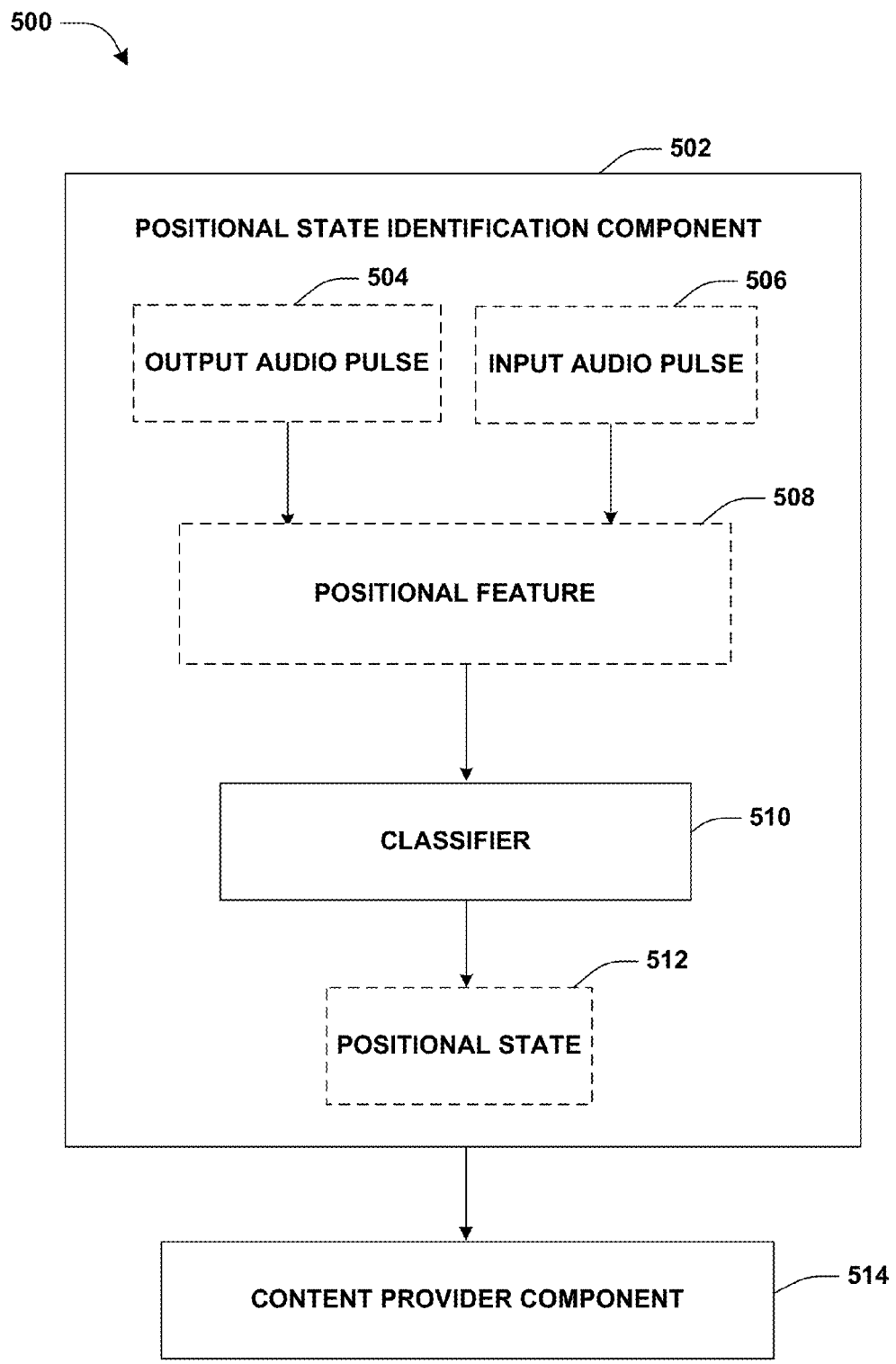
FIG. 5A is a component block diagram illustrating an example system for identifying a positional state of a mobile device.
Figure 5B:
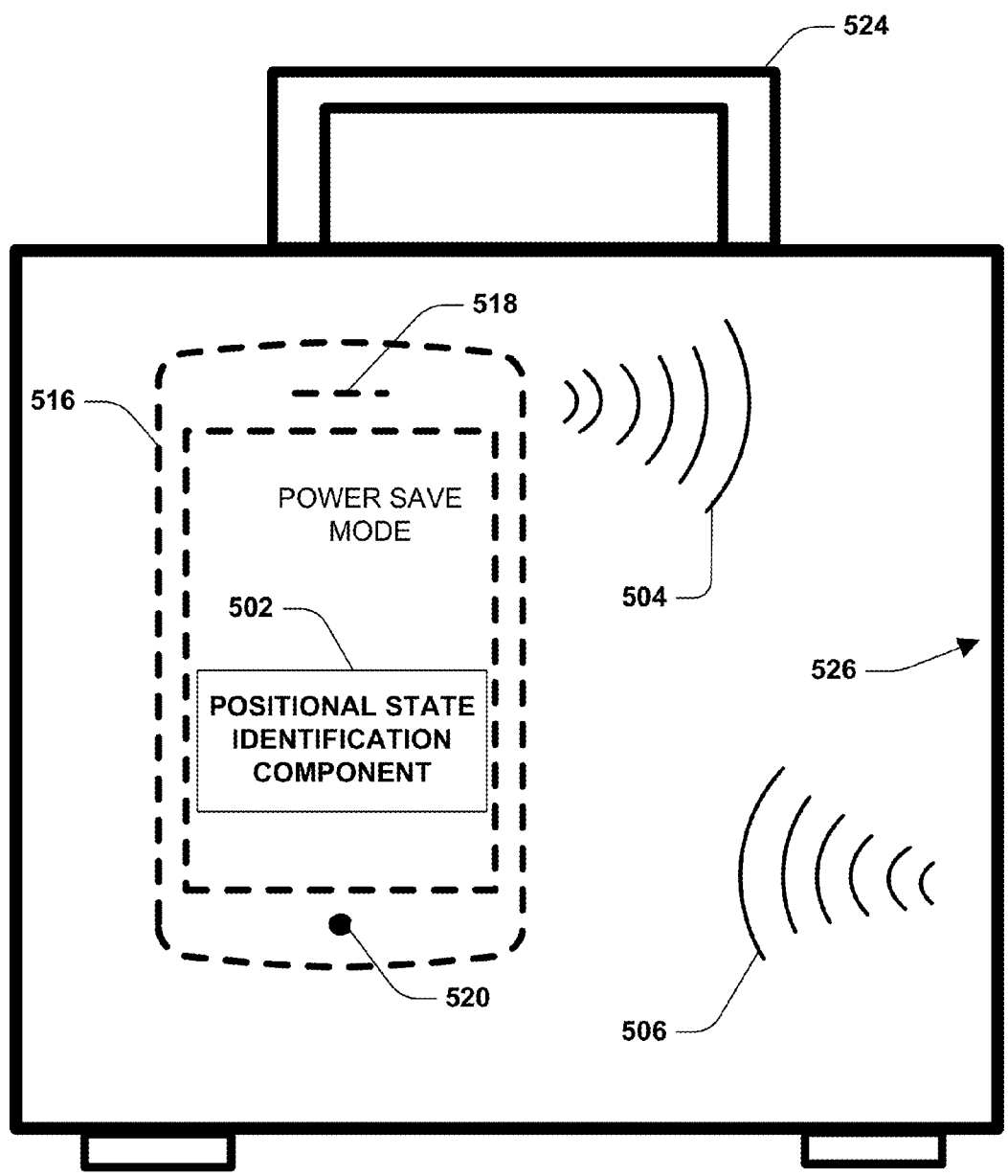
FIG. 5B is a component block diagram illustrating an example system for identifying a positional state of a mobile device, where the mobile device is within a bag.

FIGS. 5A-5B illustrate an example of a system 500, for identifying a positional state 512 of a mobile device 516 (e.g., a smart phone). The system 500 may comprise a positional state identification component 502 and/or a content provider component 514. In an example, the positional state identification component 502 may be configured to generate an output audio pulse 504 (e.g., an ultrasonic pulse, an infrasonic frequency, etc.) from a speaker 518 of the mobile device 516. The positional state identification component 502 may detect an input audio pulse 506, corresponding to the output audio pulse 504, utilizing a microphone 520 of the mobile device 516. In an example, the output audio pulse 504 may be reflected off a surface 526, such as of a bag 524, to form the input audio pulse 506 detected by the microphone 520 of the mobile device 516, as illustrated in FIG. 5B.

The positional state identification component 502 may evaluate the output audio pulse 504 and the input audio pulse 506 to determine a positional feature 508 associated with the mobile device 516. In an example, the output audio pulse 504 and the input audio pulse 506 may be evaluated based upon an analysis of an output amplitude of the output audio pulse 504 and an input amplitude of the input audio pulse 506, an output frequency of the output audio pulse 504 and an input frequency of the input audio pulse 506, and/or a time period between the generation of the output audio pulse 504 and the detection of the input audio pulse 506.

The positional state identification component 502 may evaluate the positional feature 508 utilizing a classifier 510 to identifying the positional state 512 (e.g., contained in a pocket, in a car, on a table, etc.) of the mobile device 516. In an example, the positional state identification component 502 may be configured to adjust an operating characteristic (e.g., a power characteristic, a notification characteristic, a data usage characteristic, etc.) of the mobile device 516 based on the positional state of the mobile device 516. The content provider component 514 may be configured to provide content to the mobile device 516 based upon the positional state 512. In an example, the content provider component 514 may provide the content to the user through the mobile device 516 according to a first content notification type (e.g., an email format where the mobile device will vibrate but not ding when the email is received based upon the appears to be in a meeting) in response to the positional state 512 corresponding to the first content notification type (e.g., visual notification of an email).

Figure 6:
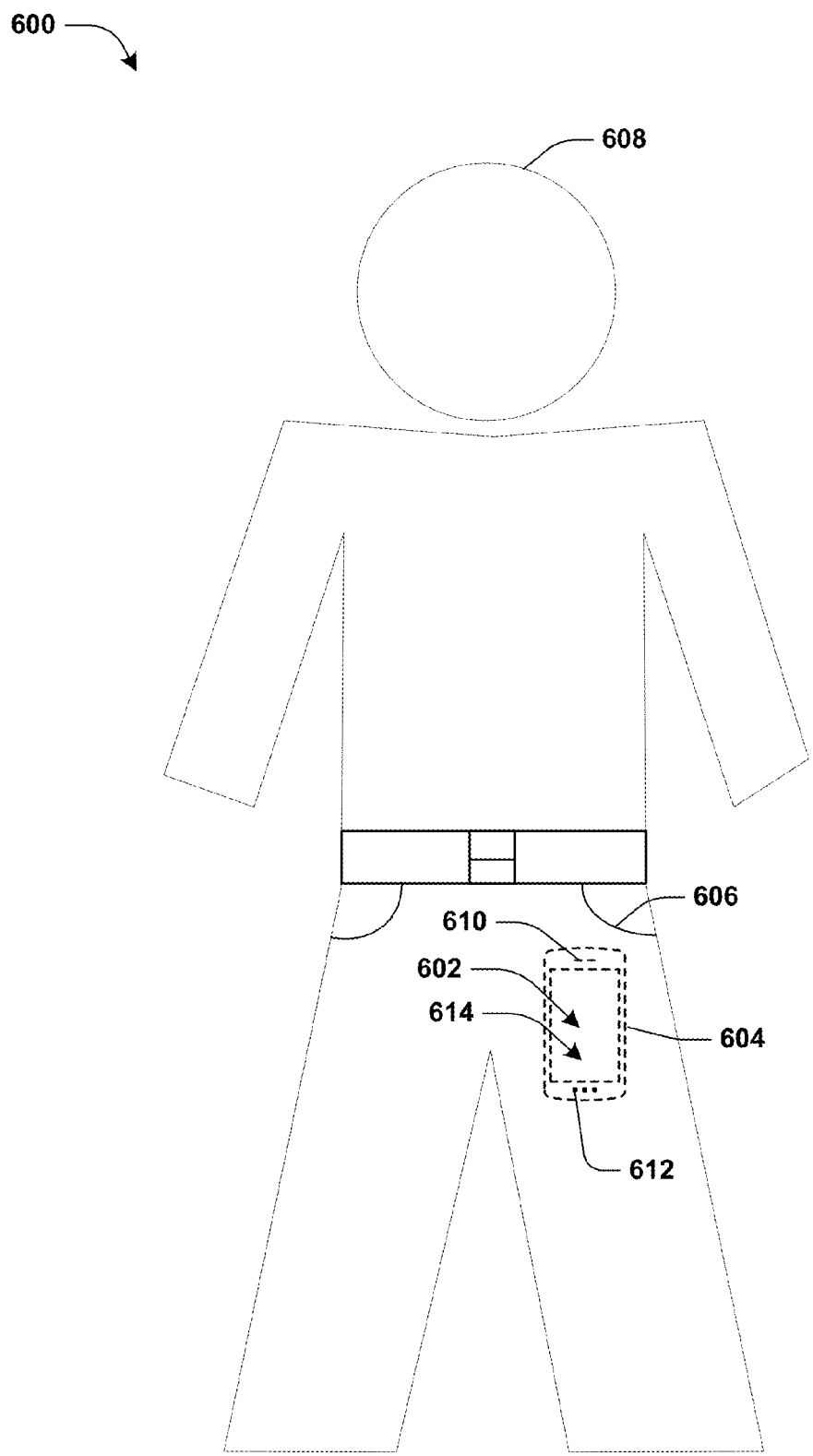
FIG. 6 is a component block diagram illustrating an example system for identifying a positional state of a mobile device, wherein a smartphone is in a pocket of a user.

FIG. 6 illustrates an example of a system 600 for identifying a positional state of a smartphone 604, where the smartphone 604 is identified as being contained within a pocket 606 of a user 608. In an example, a positional state identification component 602 may be configured to generate an output audio pulse from a speaker 610 of the smartphone 604. The positional state identification component 602 may be configured to detect an input audio pulse, corresponding to the output audio pulse, utilizing a microphone 612 of the smartphone 604. In an example, the input audio pulse is generated based upon the output audio pulse reflecting off the pocket 606. The output audio pulse and the input audio pulse may be evaluated by the positional state identification component 602 to determine a positional feature associated with the smartphone 604. The positional state identification component 602 may evaluate the positional feature (e.g., corresponding to a convolution of an output wave, of the output audio pulse, and conditions associated with a contact surface, such as the pocket 606) utilizing a classifier to identify the positional state corresponding to the smartphone 604 being contained within the pocket 606 of the user 608. In an example, responsive to the smartphone 604 being contained within the pocket 606, a content provider component 614 may be configured to adjust a notification type of the smartphone 604 to a vibration notification. For example, if the user 608 receives a text message with the smartphone 604 being contained within the pocket 606, the user 608 may be notified through a vibrational notification produced by the smartphone 604.

Figure 7A:
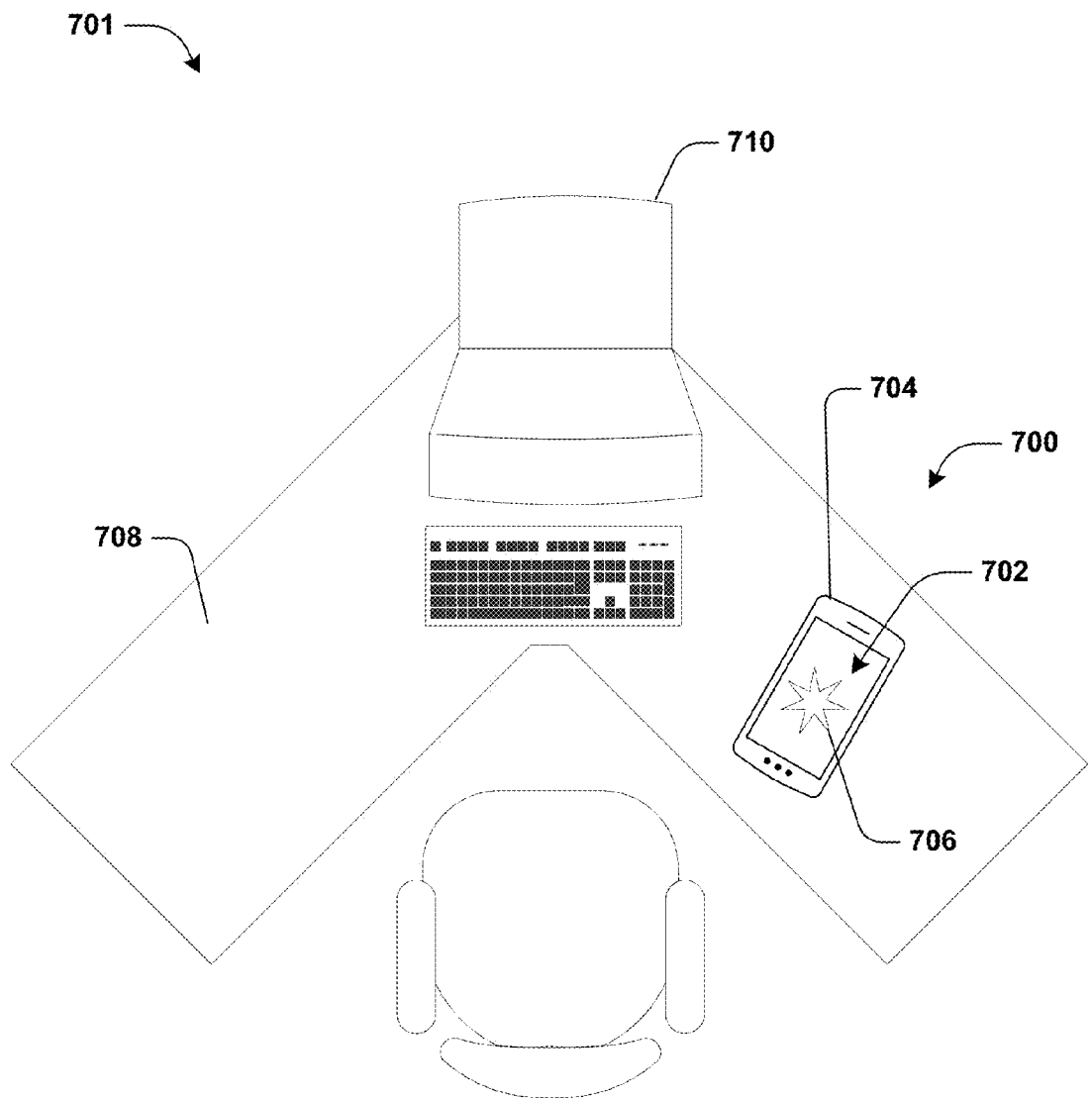
FIG. 7A is a component block diagram illustrating an example system for identifying a positional state of a mobile device, wherein a smartphone is sitting on a surface of a desk.
Figure 7B:
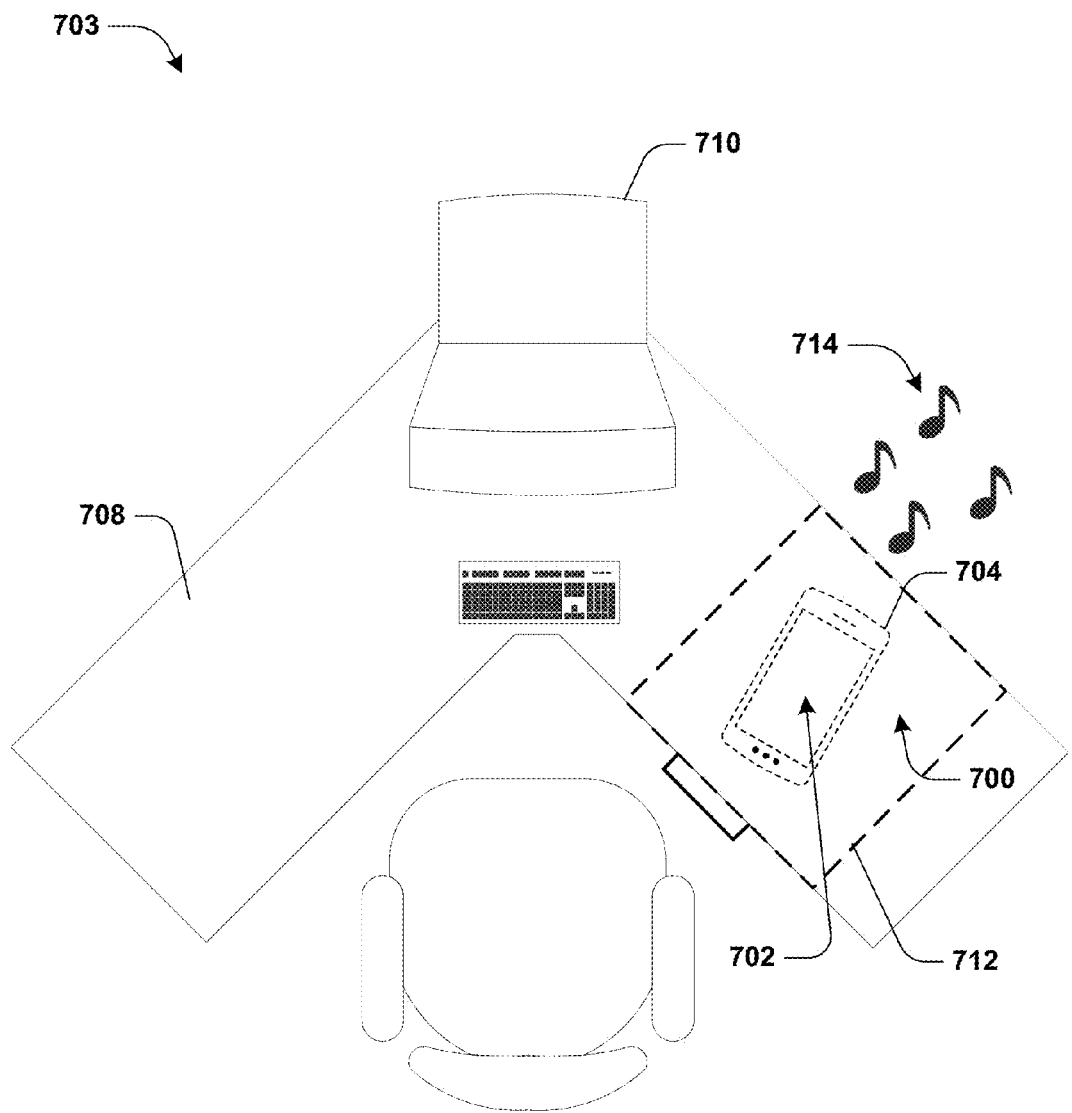
FIG. 7B is a component block diagram illustrating an example system for identifying a positional state of a mobile device, wherein a smartphone is in a desk drawer and provides an audio notification.
Figure 7C:
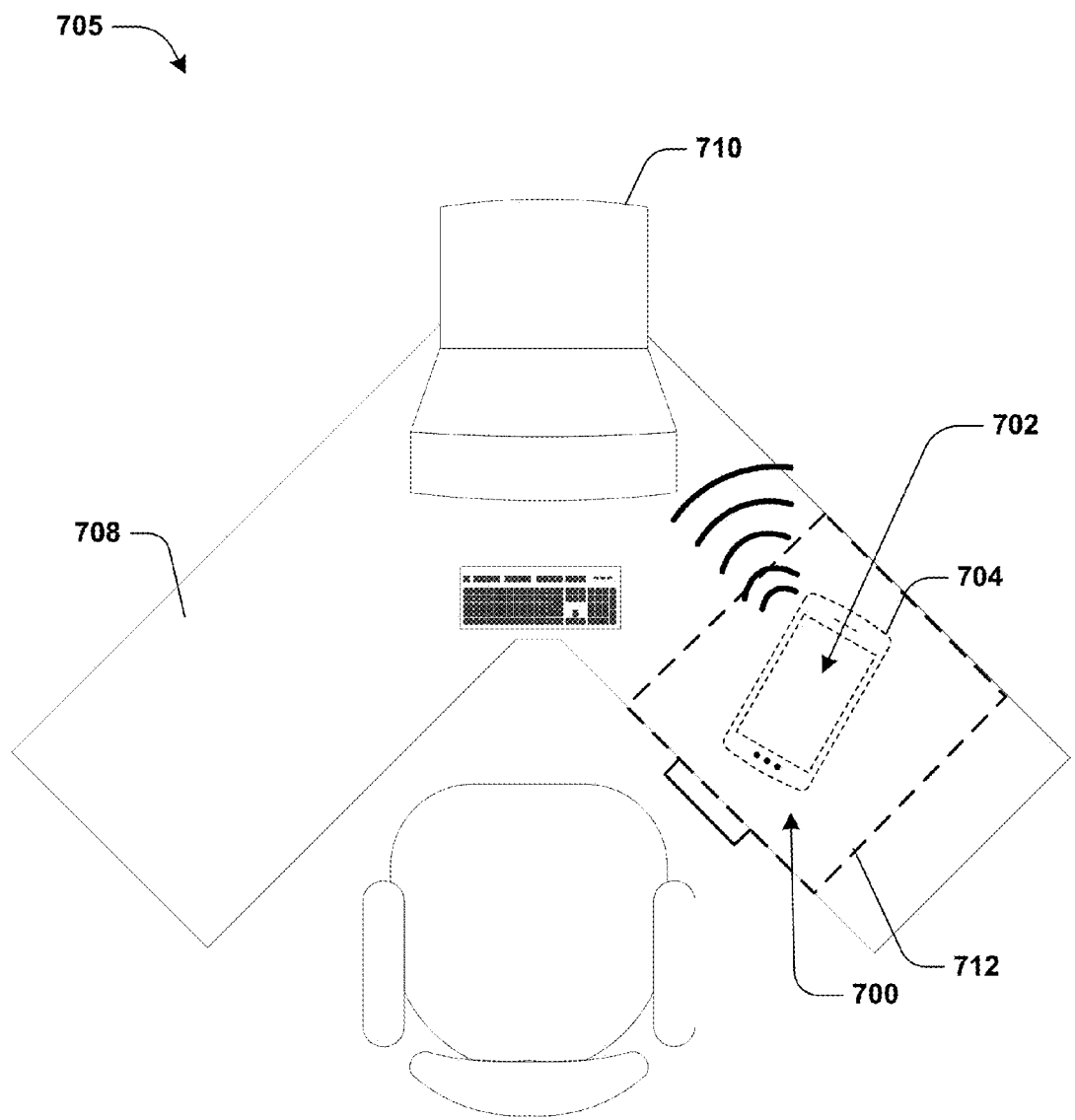
FIG. 7C is a component block diagram illustrating an example system for identifying a positional state of a mobile device, wherein a smartphone is in a desk drawer and provides a notification on a secondary device.

FIGS. 7A-7C illustrate examples of system 700 for adjusting notification characteristics based upon a positional state of the tablet 704. FIG. 7A illustrates an example 701 of a positional state identification component 702 identifying the positional state of the tablet 704 as being on a surface of a desk 708. Responsive to the positional state identification component 702 indicating that the positional state of the tablet 704 as being on the surface of the desk 708, the tablet 704 may be transitioned from an audible notification mode to a visual notification mode. In an example, a user may prefer to have the tablet 704 display a visual notification 706 when a screen of the tablet 704 is viewable (e.g., exceeding an awareness threshold) from the desk 708.

FIG. 7B illustrates an example 703 of the positional state identification component 702 identifying a second positional state of the tablet 704 as being in a drawer 712 of the desk 708. Responsive to the positional state identification component 702 indicating that the second positional state of the tablet 704 as being in the drawer 712 of the desk 708, the tablet 704 may be transitioned from a visual notification mode to an audio notification mode (e.g., based upon the tablet 704 not exceeding an awareness threshold with respect to the user because the tablet is not visible to the user while in the drawer 712). In an example, an audio notification 714 (e.g., a ringtone, a beep, a chime, etc.) may be produced (e.g., through a speaker) by the tablet 704 in response to receiving content, such as a text message. Accordingly, even if the tablet 704 is set to produce visual notifications, the positional state identification component 702 may adjust the notification type to audio notifications so that the user may have a higher likelihood of receiving notification of the text message.

FIG. 7C illustrates an example 705 of a positional state identification component 702 identifying a third positional state of the tablet 704 as being in the drawer 712 within the desk 708. Responsive to the positional state identification component 702 identifying the third positional state of the tablet 704 as being in the drawer 712, the tablet 704 and/or a content provider may be configured to connect to a second device, such as a personal computer 710. In an example, content obtained by the tablet 704, such as emails, text messages, incoming calls, etc., may be provided to the user through the personal computer 710. In an example, the tablet 704 may be configured to connect to the personal computer 710 based upon the tablet 704 not satisfying an awareness threshold (e.g., in response to the drawer 712 being in a closed position).

Figure 8:
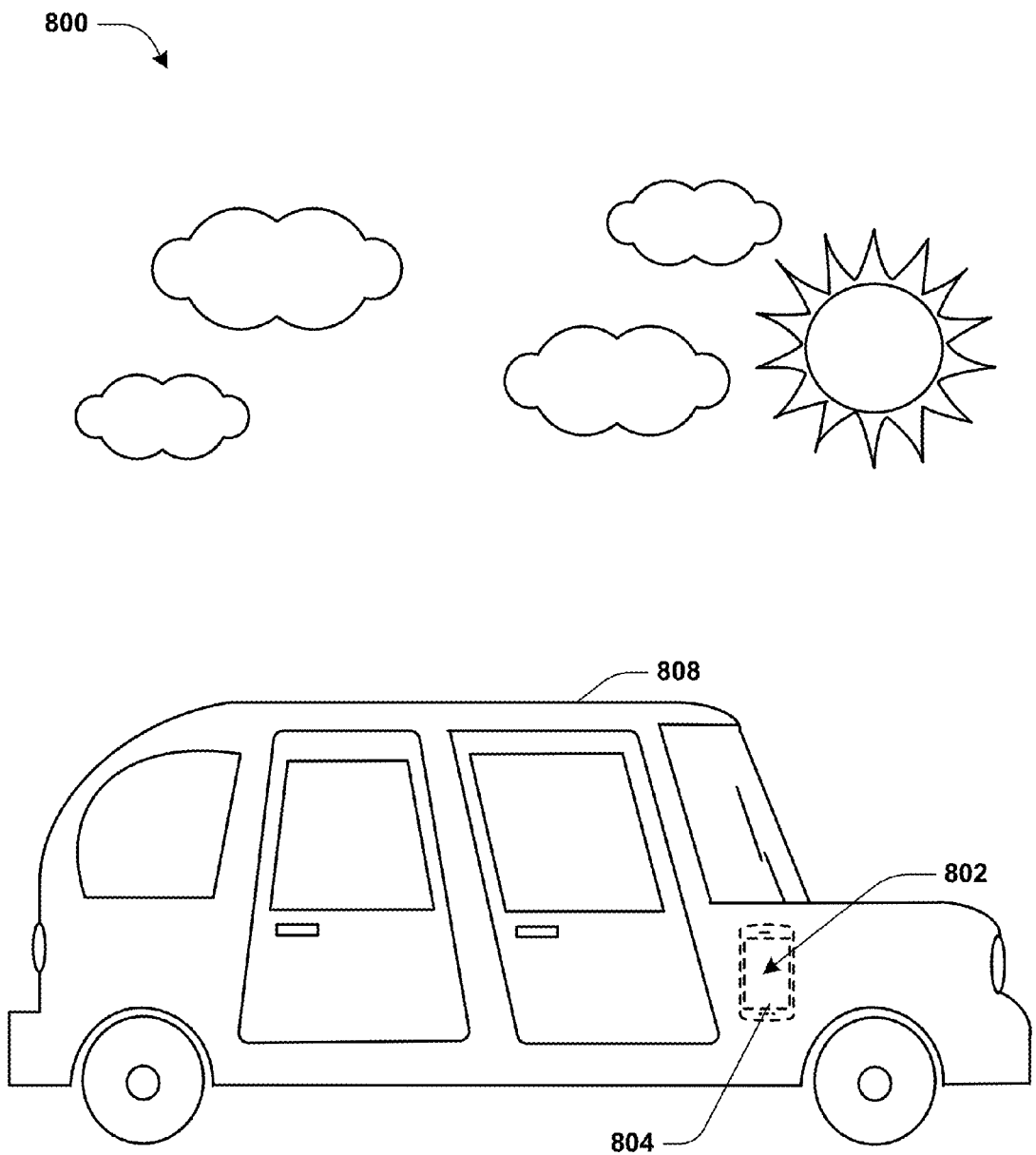
FIG. 8 is a component block diagram illustrating an example system for identifying a positional state of a mobile device, wherein the mobile device is in a bag inside a car.

FIG. 8 illustrates an example of system 800 for identifying a positional state of a smartphone 804, where the smartphone 804 is being contained within a car 808. In an example, a positional state identification component 802 may identify the positional state of the smartphone 804 as being contained within the car 808 based upon an evaluation of an input audio pulse generated by a speaker of the smartphone 804 and an output audio pulse detected by a microphone of the smartphone 804. The positional state identification component 802 may adjust a power characteristic, such as a power mode type of the smartphone 804, based upon the smartphone 804 being within the car 808. For example, the positional state identification component 802 may adjust the power mode type of the smartphone 804 from a higher power consumption mode to a lower power consumption mode to conserve system resources while traveling in the car 808. In an example, a data usage characteristic, a processing characteristic, and/or an application management characteristic may also be adjusted from a higher usage mode (e.g., a normal operating mode) to a lower usage mode (e.g., a sleep mode) in order to mitigate wasting system resources such as battery life (e.g., a lower usage mode may reduce the utilization of cellular data by reducing the frequency with which an application, such as an email app, checks for updates; the lower usage mode may reduce the processing power allocated to a mobile application running in a background mode; etc.).

Figure 9A:
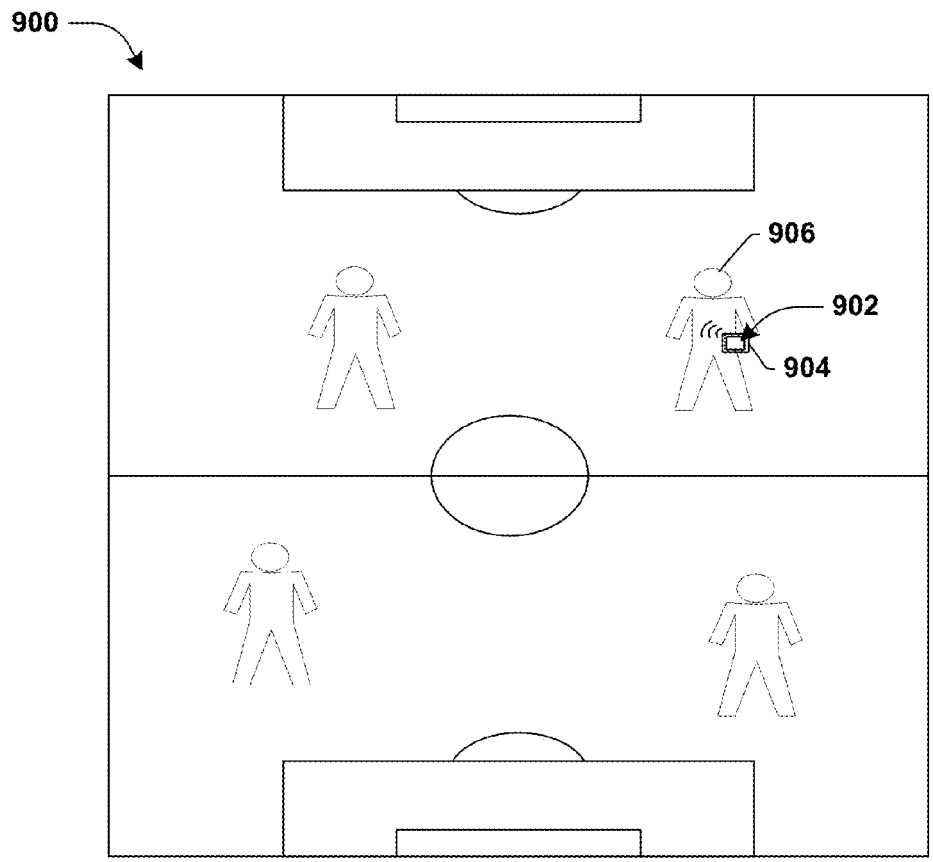
FIG. 9A is a component block diagram illustrating an example system for identifying a positional state of a mobile device, wherein the mobile device is being held by a user.
Figure 9B:
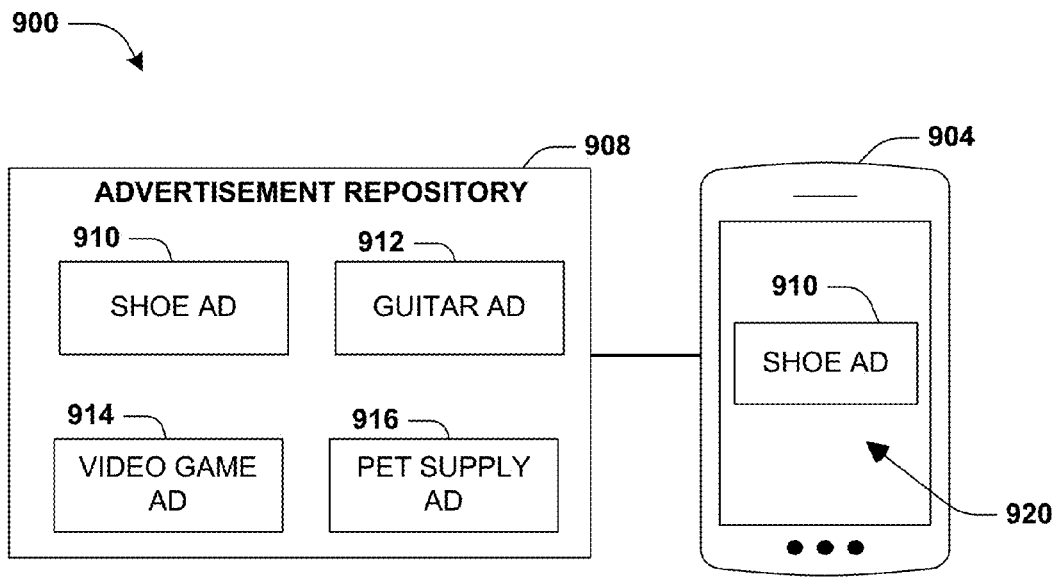
FIG. 9B is a component block diagram illustrating an example system for identifying a positional state of a mobile device, wherein content is selected.

FIGS. 9A-9B illustrate examples of a system 900 for identifying a positional state of a smartphone 904. For example, a positional state identification component 902 may identify a positional state of the smartphone 904 as being comprised within a pocket of a user 906 that is moving according to a pattern indicative of a person playing soccer. A content provider component may query an advertisement repository 908 comprising advertisements (e.g., a shoe advertisements 910, a guitar advertisement 912, a videogame advertisement 914, a pet supply advertisement 916, and/or other advertisements not illustrated) or may query any other content repository (e.g., a website, a social network, etc.) to identify content, such as the shoe advertisement 910, that may be relevant to the user 906 playing soccer. In this way, relevant content, such as the shoe advertisement 910, may be provided to the user 906, such as on a display 920 of the smartphone 904

Figure 10:
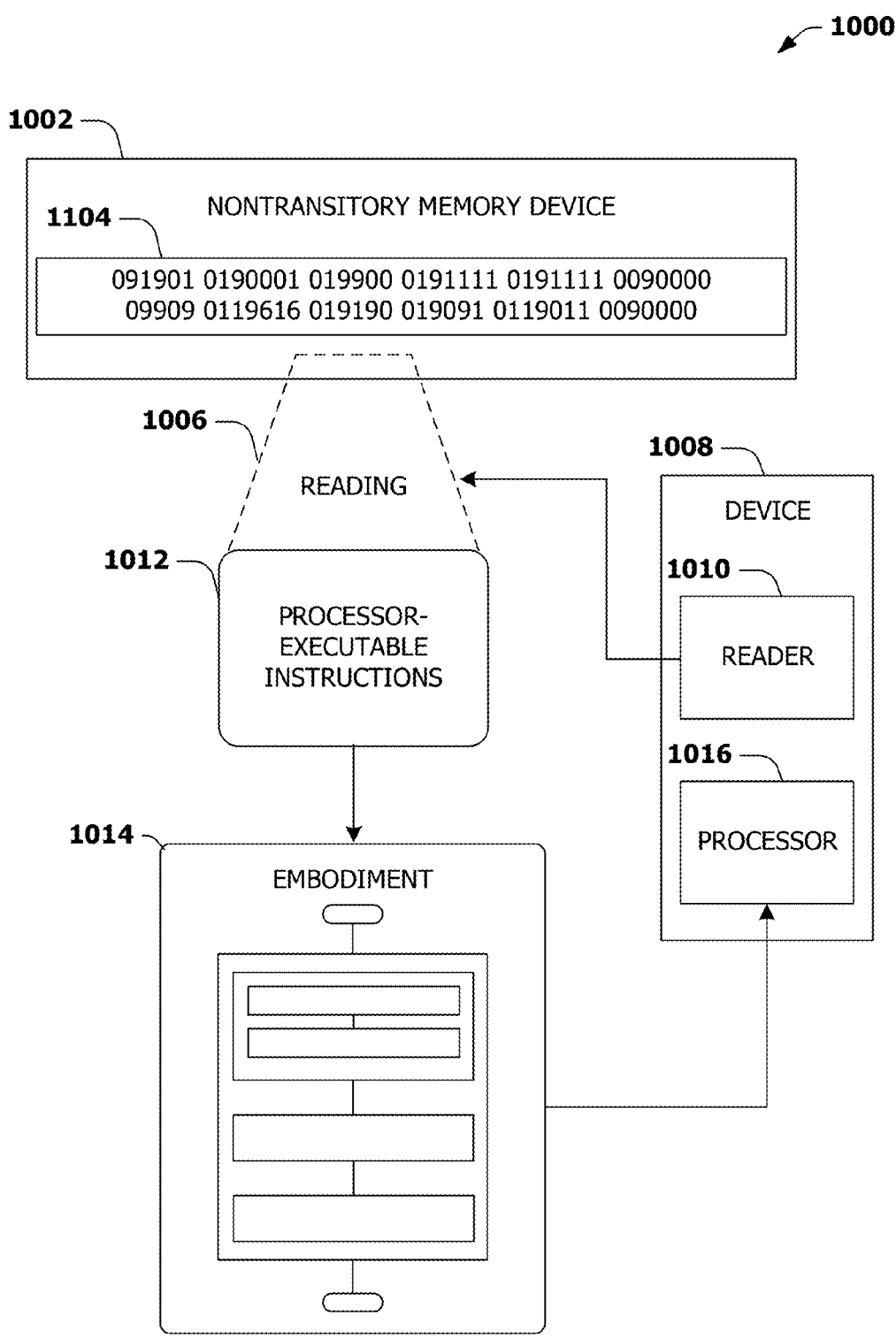
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, for example. In some embodiments, the processor-executable instructions, when executed on the processor 1016 of the device 1008, are configured to implement a system, such as at least some of the example system 500 of FIGS. 5A-5B, at least some of the example system 600 of FIG. 6, at least some of example system 700 of FIGS. 7A-7C, at least some of the example system 800 of FIG. 8, and/or at least some of example system 900 of FIGS. 9A-9B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for identifying a positional state of a mobile device, comprising:
    generating an output audio pulse from a speaker of a mobile device;
    detecting an input audio pulse, corresponding to the output audio pulse, utilizing a microphone of the mobile device;
    evaluating the output audio pulse and the input audio pulse to determine a positional feature associated with the mobile device; and
    evaluating the positional feature utilizing a classifier to determine a positional state of the mobile device indicative of the mobile device lying on a surface.

2. The method of claim 1, comprising:
    adjusting an operating characteristic of the mobile device based upon the positional state of the mobile device.

3. The method of claim 2, the adjusting an operating characteristic comprising:
    modifying an operation of at least one of a display, an audio component, a vibrator, a processor, a camera, or a communication module of the mobile device.

4. The method of claim 1, the positional state indicating at least one of:
    the mobile device being contained within a bag;
    the mobile device being located within a vehicle;
    the mobile device is being interact with by a user;
    the mobile device is stationary;
    the mobile device is not stationary; or
    the mobile device being located in an outdoor area.

5. The method of claim 2, the operating characteristic comprising at least one of:
    a power characteristic, a notification characteristic, a data usage characteristic, a processing characteristic, or an application management characteristic.

6. The method of claim 2, the adjusting an operating characteristic comprising:
    adjusting at least one of a notification type of an notification, a volume level of an audio notification, or a vibration level of a vibration notification.

7. The method of claim 2, the adjusting an operating characteristic comprising:
    adjusting a performance mode of the mobile device.

8. The method of claim 2, the adjusting an operating characteristic comprising:
    adjusting a data usage function of an application operating on the mobile device.

9. The method of claim 1, comprising:
    responsive to the positional state indicating that the mobile device is contained within at least one of a container, or a bag, transitioning the mobile device from a first power state to a second power state, the second power state having lower power consumption than the first power state.

10. The method of claim 1, comprising:
    generating a recommendation for content based upon the positional state;
    selecting a recommendation notification type based upon the positional state; and
    providing the recommendation to the mobile device according to the recommendation notification type.

11. The method of claim 10, the recommendation notification type comprising at least one of an audio notification, a vibration notification, a text message, a visual notification, an email, a video notification, a push notification, or display of an application user interface.

12. The method of claim 2, comprising:
    obtaining user feedback, from the user, corresponding to adjustment of the operating characteristic; and
    training the classifier based upon the user feedback.

13. The method of claim 1, comprising:
    identifying user interest information based upon the positional state, the user interest information corresponding at least one of an interest of the user or an activity of the user;
    obtaining content corresponding to the user interest information; and
    providing the content to the mobile device.

14. The method of claim 1, the evaluating the output audio pulse and the input audio pulse comprising at least one of:
    comparing an output amplitude of the output audio pulse with an input amplitude of the input audio pulse to determine the positional feature; or
    identifying the positional feature based upon a time period between generation of the output audio pulse and detection of the input audio pulse.

15. The method of claim 1, the output audio pulse comprising a modulated signal.

16. The method of claim 1, the generating the output audio pulse comprising:
    emitting the output audio pulse at least one of an ultrasonic frequency or an infrasonic frequency.

17. The method of claim 1, comprising:
    responsive to the positional state indicating a user awareness of the mobile device exceeding an awareness threshold, providing content to the user through the mobile device; and responsive to the user awareness of the mobile device not exceeding the awareness threshold, providing content to the user through a second device.

18. A system for identifying a positional state of a mobile device, comprising:
a positional state identification component configured to:
generate an output audio pulse from a speaker of a mobile device;
detect an input audio pulse, corresponding to the output audio pulse, utilizing a microphone of the mobile device;
evaluate, by a time of flight analysis, the output audio pulse and the input audio pulse to determine a positional feature associated with the mobile device, the evaluating comprising:
responsive to the time of flight analysis indicating a first amount of time for a pulse to travel a distance, determining that the pulse is travelling through a first medium; and
responsive to the time of flight analysis indicating a second amount of time for the pulse to travel the distance, determining that the pulse is travelling through a second medium; and
evaluate the positional feature utilizing a classifier to identify a positional state of the mobile device; and
a content provider component configured to:
provide content to the mobile device based upon the positional state.

19. A non-transitory computer readable medium comprising instructions which when executed perform a method for identifying a positional state of a mobile device, comprising:
generating an output audio pulse from a speaker of a mobile device;
detecting an input audio pulse, corresponding to the output audio pulse, utilizing a microphone of the mobile device;
evaluating the output audio pulse and the input audio pulse to determine a positional feature associated with the mobile device;
evaluating the positional feature utilizing a classifier to identifying a positional state of the mobile device;
responsive to the positional state identified by the classifier corresponding to the mobile device being held in a hand of a user, providing content to the user according to a first content notification type; and
responsive to the positional state identified by the classifier corresponding to the mobile device not being held in the hand of the user, providing the content to the user according to a second content notification type.

* * * * *